(12) United States Patent
Xu et al.

(10) Patent No.: US 10,140,451 B2
(45) Date of Patent: Nov. 27, 2018

(54) DETECTION OF MALICIOUS SCRIPTING LANGUAGE CODE IN A NETWORK ENVIRONMENT

(71) Applicant: McAfee, LLC, Santa Clara, CA (US)

(72) Inventors: Chong Xu, Sunnyvale, CA (US); Bing Sun, Santa Clara, CA (US); Navtej Singh, Bangalore (IN); Yichong Lin, Freemont, CA (US); Zheng Bu, Freemont, CA (US)

(73) Assignee: McAfee, LLC., Santa Clara, CA (US)

( * ) Notice: Subject to any disclaimer, the term of this patent is extended or adjusted under 35 U.S.C. 154(b) by 0 days.

(21) Appl. No.: 14/761,285

(22) PCT Filed: Jan. 16, 2014

(86) PCT No.: PCT/US2014/011907
§ 371 (c)(1),
(2) Date: Jul. 15, 2015

(87) PCT Pub. No.: WO2014/113597
PCT Pub. Date: Jul. 24, 2014

(65) Prior Publication Data
US 2015/0363598 A1      Dec. 17, 2015

(30) Foreign Application Priority Data
Jan. 16, 2013   (IN) .............................. 50/KOL/2013

(51) Int. Cl.
*G06F 21/56*     (2013.01)
(52) U.S. Cl.
CPC .......... *G06F 21/563* (2013.01); *G06F 21/564* (2013.01); *G06F 21/566* (2013.01); *G06F 21/567* (2013.01)

(58) Field of Classification Search
None
See application file for complete search history.

(56) References Cited

U.S. PATENT DOCUMENTS

| 5,987,610 A | 11/1999 | Franczek et al. |
| 6,073,142 A | 6/2000 | Geiger et al. |

(Continued)

FOREIGN PATENT DOCUMENTS

WO    WO 2003/009532    1/2003

OTHER PUBLICATIONS

Curtsinger et al., "Zozzle: Fast and Precise In-Browser JavaScript Malware Detection", Jun. 9, 2011, pp. 1-16.*

(Continued)

*Primary Examiner* — Henry Tsang
(74) *Attorney, Agent, or Firm* — Patent Capital Group

(57) ABSTRACT

A method is provided in one example embodiment and includes initiating an execution of a compiled script, evaluating a function called in the compiled script, detecting an execution event based on at least a first criterion, and storing information associated with the execution event in an execution event queue. The method also includes verifying a correlation signature based on information associated with at least one execution event in the execution event queue. In specific embodiments, the method includes evaluating an assignment statement of a script during compilation of the script by a compiler, detecting a compilation event based on at least a second criterion, and storing information associated with the compilation event in a compilation event queue. In yet additional embodiments, the verification of the correlation signature is based in part on information associated with one or more compilation events in the compilation event queue.

23 Claims, 8 Drawing Sheets

(56) References Cited

U.S. PATENT DOCUMENTS

| | | | |
|---|---|---|---|
| 6,460,050 B1 | 10/2002 | Pace et al. | |
| 7,340,777 B1* | 3/2008 | Szor | G06F 21/562 |
| | | | 713/165 |
| 7,506,155 B1 | 3/2009 | Stewart et al. | |
| 7,904,955 B1* | 3/2011 | Bu | G06F 21/52 |
| | | | 726/22 |
| 2006/0230449 A1* | 10/2006 | Fox | G06F 21/564 |
| | | | 726/22 |
| 2007/0083813 A1 | 4/2007 | Lui et al. | |
| 2009/0070663 A1* | 3/2009 | Fan | G06F 21/566 |
| | | | 715/234 |
| 2009/0126015 A1* | 5/2009 | Monastyrsky | G06F 21/566 |
| | | | 726/23 |
| 2009/0300764 A1* | 12/2009 | Freeman | G06F 21/55 |
| | | | 726/24 |
| 2011/0197272 A1* | 8/2011 | Mony | G06F 21/566 |
| | | | 726/12 |
| 2012/0266244 A1 | 10/2012 | Green et al. | |

OTHER PUBLICATIONS

"Cujo: Efficient Detection and Prevention of Drive-by-Download Attacks", Rieck et al, Proceedings of the 26th Annual Computer Security Applications Conference on, ACSAC '10, Jan. 1, 2010, p. 31.

"Zozzle: Fast and Precise In-Browser JavaScript Malware Detection", Curtsinger, Charlie, University of Massachusetts, et al., USENIX, Jun. 9, 2011 pp. 1-16 [retrieved from the internet on Jun. 9, 2011].

Extended European Search Report in Application No. EP14741074.0 dated Aug. 1, 2016.

PCT International Search Report and Written Opinion in PCT International Application Serial No. PCT/US2014/011907 dated May 14, 2014 (11 pages).

Korean Patent Office Notice of Preliminary Rejection in Korean Application No. 10-2015-7017244 dated Oct. 14, 2016.

Chinese Patent Office First Office Action in Chinese Patent Application No. 201480003756.X dated May 2, 2017, 19 pages.

Curtsinger et al., "ZOZZLE: Fast and Precise In-Browser JavaScript Malware Detection", USENIX, Jun. 9, 2011, 16 pages.

Korean Patent Office Notice of Final Rejection in Korean Patent Application No. 10-2015-7017244 dated May 19, 2017, 7 pages.

Korean Patent Office Notice of Allowance in Korean Patent Application No. 10-2015-7017244 dated Sep. 15, 2017, 3 pages including Summary of Relevance.

Chinese Patent Office Second Office Action in Application No. 201480003756.X, dated Jan. 31, 2018, No English Translation, 10 pages with Summary of Relevance.

Chinese Patent Office Third Office Action in Chinese Patent Application No. 201480003756.X dated Aug. 1, 2018, 4 pages, with Summary of Relevance.

* cited by examiner

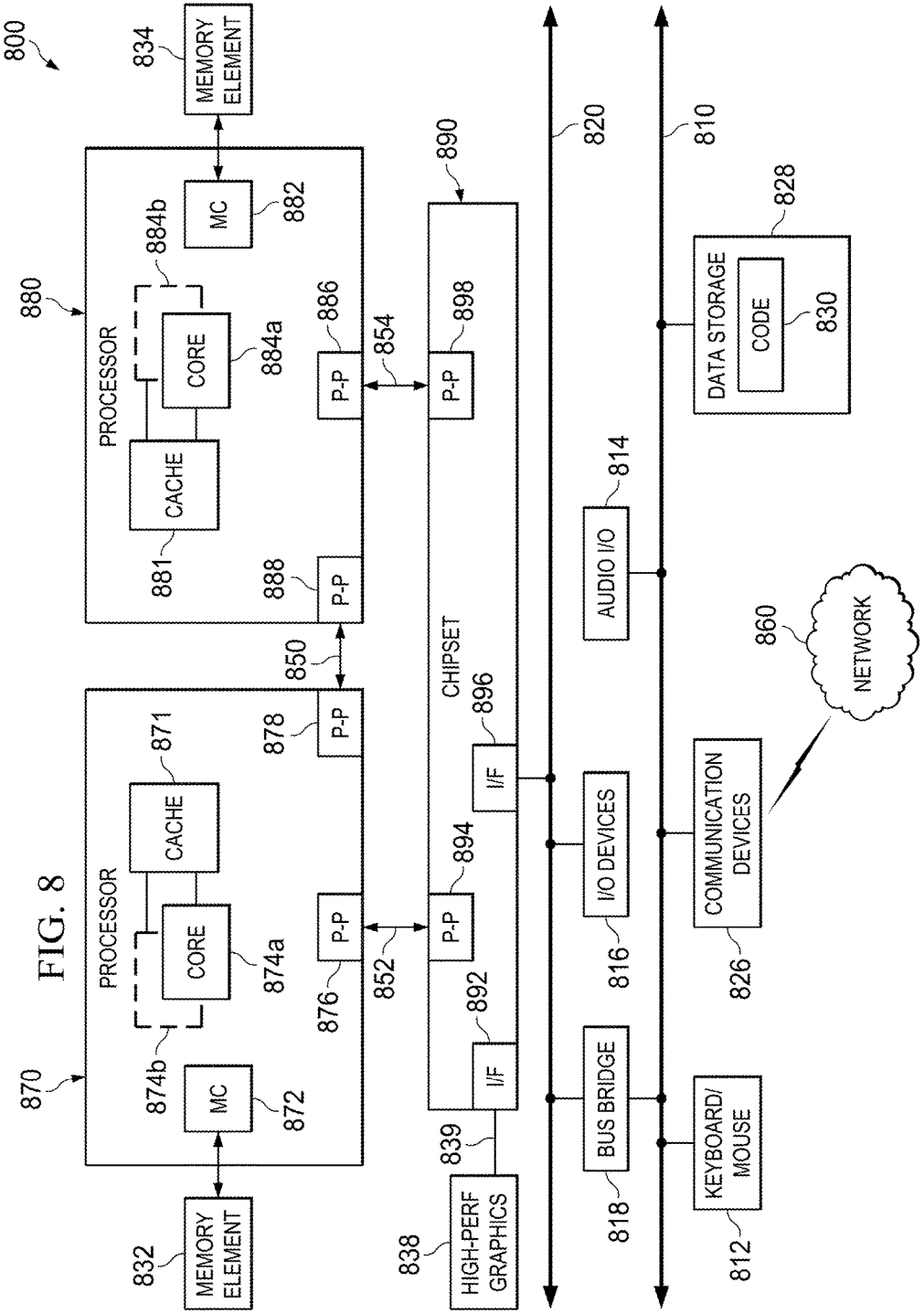

DETECTION OF MALICIOUS SCRIPTING LANGUAGE CODE IN A NETWORK ENVIRONMENT

CROSS-REFERENCE TO RELATED APPLICATIONS

This Application is a national stage application under 35 U.S.C. § 371 of PCT International Application Serial No. PCT/US2014/011907, filed on Jan. 16, 2014 and entitled DETECTION OF MALICIOUS SCRIPTING LANGUAGE CODE IN A NETWORK ENVIRONMENT, which application claims the benefit of priority to Indian Patent Application Serial No. 50/KOL/2013 filed in the Patent Office of India on Jan. 16, 2013. The disclosures of the prior applications are considered part of and are hereby incorporated by reference in their entirety in the disclosure of this application.

TECHNICAL FIELD

This disclosure relates in general to the field of network security and, more particularly, to a detection of malicious scripting language code in a network environment.

BACKGROUND

The field of computer network security has become increasingly important and complicated in today's society. Computer network environments are configured for virtually every enterprise or organization, typically with multiple interconnected computers (e.g., end user computers, laptops, servers, mobile devices, etc.). Typically, these network environments are configured to communicate with other network environments via wide area networks, such as the Internet. Thus, various files can be transferred from one end host to another end host in the same or different networks. These files may be transferred via any suitable electronic communication mechanism including, for example, electronic mail ('email') messages, HyperText Transfer Protocol (HTTP), file transfer protocol (FTP), and peer-to-peer file sharing.

Scanning executable software files and other objects is a technique that is often used to detect malicious code ("malware") or other threats on a computer. Scanning objects for malware is generally performed using a static signature of known malicious code. Computer attackers often use a scripting language, such as JavaScript, to insert malicious code in otherwise benign files. The scripting language may be dynamic in nature and, in addition, obfuscation techniques are generally used to further hinder the detection of the malicious code. Thus, innovative tools are needed to detect malicious code in the form of a scripting language in objects that are transferred across computer network environments.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8 is a simplified block diagram of an example computing system according to an embodiment.

DETAILED DESCRIPTION OF EXAMPLE EMBODIMENTS

Example Embodiments

Figure 1:
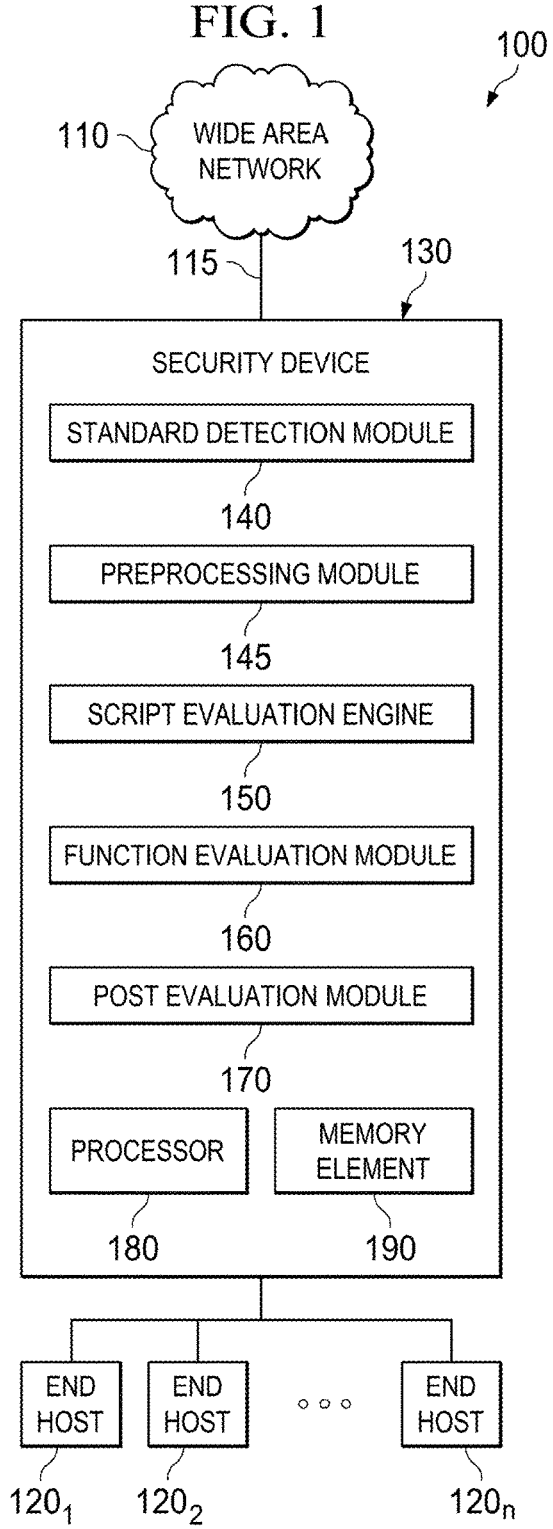
FIG. 1 is a simplified block diagram illustrating a communication system for detection of malicious scripting language code in a network environment, according to an example embodiment.

FIG. 1 is a simplified block diagram illustrating an example implementation of a communication system 100 for detection of malicious scripting language code. End hosts 120$_1$ through 120$_n$ can be provided in a network 115, which could be a local area network (LAN), an Intranet, or other network that provides access to a wide area network (WAN) 110, such as the Internet, and/or to other networks. Network 115 can also include a security device 130 that receives network traffic incoming to network 115 from other networks, such as WAN 110. Security device may also receive network traffic outgoing to other networks, such as WAN 110. Security device 130 can include a standard detection module 140, a preprocessing module 145, a script evaluation engine 150, an function evaluation module 160, and a post evaluation module 170. Security device may also include a processor 180 and a memory element 190. Where appropriate herein, end hosts 120$_{1-n}$ are referred to collectively as 'end hosts 120' and singularly as 'end host 120' for ease of reference.

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs. Additionally, radio signal communications over a cellular network may also be provided in communication system 100.

For purposes of illustrating the techniques of communication system 100, it is important to understand the activities and security concerns that may be present in a given network, such as network 115 shown in FIG. 1. The following foundational information may be viewed as a basis from which the present disclosure may be properly explained. Such information is offered for purposes of explanation only and, accordingly, should not be construed in any way to limit the broad scope of the present disclosure and its potential applications.

Network traffic can present many security threats on devices in a computer network. Security threats generally fit into one or more of the following categories: (1) malware; (2) spyware; (3) privacy threats; and (4) vulnerable applications. Malware includes software or code that is designed to engage in malicious, hostile, intrusive, unwanted, and/or unauthorized behavior on an electronic device. Examples of malware can include, but are not limited to, computer viruses, worms, bots, and Trojan horses. Malware generally includes any software designed to interfere with the normal operation of a computer or network through unauthorized access, destruction, disclosure, modification of data, and/or denial of service. Malware is often designed to perform actions without a user's knowledge, such as making changes to a device such as an end host, sending unsolicited messages to other devices from the infected device, or giving an attacker remote control over the device. Malware can also be used to steal personal information from a device that could result in identity theft, financial fraud, or other invasions of privacy (e.g., personal medical information).

Spyware is software that is designed to collect or use data without a user's knowledge or approval. Privacy threats can be caused by applications that may not necessarily harm the device, but may gather or use information, without authorization, that is unnecessary to perform their primary functions. Examples of such information could include, but is not limited to, a user's location, contact lists, personally identifiable information, financial information, medical information, confidential or sensitive corporate data, etc.

Vulnerable applications can contain software vulnerabilities that can be exploited for malicious purposes. For example, vulnerabilities can often allow an attacker to use malicious code to access sensitive information, perform undesirable actions, stop a service from functioning correctly, automatically download malicious software, or otherwise engage in undesirable behavior. In some instances, malicious code can gain control of the vulnerable application, crash the vulnerable application, and/or infect the device on which the vulnerable application is executing.

Network traffic can transport software applications and other objects containing malicious code to end hosts and network elements in computer network environments. For example, downloadable objects, objects attached to email messages, or objects transferred via a peer to peer communication, can result in the transmission of malicious code across network environments to a receiving end host or network element. In particular, a scripting language such as ECMAScript or variants thereof, such as JavaScript, can be used to embed code in files such as HyperText Markup Language (HTML) files and Portable Document Format (PDF) files. ECMAScript is the scripting language standardized by Ecma International in the ECMA-262 specification and ISO/IEC 16262. JavaScript code can be embedded in files as a script, for example, using a <script> tag for HTML files or using /JS or /JavaScript for PDF files. The JavaScript can be embedded directly into the file or an external file that contains the JavaScript can be specified.

Various types of security solutions can be used to attempt to prevent malware attacks, to detect malware and other threats on computers, and/or to remediate computers when needed. For instance, signature based threat detection is a common antivirus technique that involves searching for known patterns of data within an object. An intrusion prevention system (IPS) is one example, and can be configured as a network based appliance that listens to all traffic on the network and tries to parse it to find malicious patterns or attacks within the network traffic. The IPS can generate signatures of objects received in network traffic and compare the signatures against current known malicious signatures. A signature of an object can be generated from a cryptographic hash function, which is an algorithm that takes a block of data from the object and returns a fixed-size bit string. The fixed-size bit string is the hash value or signature. Examples of hash functions can include, but are not limited to: 1) Message-Digest Algorithm (e.g., MD5), defined by Network Working Group, Requests for Comments (RFC) 1321, R. Rivest, et al., April 1992, and 2) secure hash algorithm (SHA-1, SHA-2, SHA3), published by the United States National Institute of Standards and Technology (NIST) as a U.S. Federal Information Processing Standard.

In a particular example, the network traffic may be a PDF file being downloaded from a web server to a browser on an end host. The IPS can listen to that network traffic, because the recipient end host knows what is being transferred in order to understand and interpret the file format. Standard detection by the IPS may include calculating one or more MD5 hashes of the PDF file and comparing the one or more hashes to static signatures of known malicious code. If there is a match, then the PDF file can be identified as malicious.

Although signature detection can be useful for identifying malicious static objects that do not change, scripting languages can be used in certain objects to evade detection. JavaScript, as seen on the wire (i.e., in network traffic), is a free form text. The dynamic nature of JavaScript allows attackers to introduce multiple evasion techniques that can bypass IPS signature detection. For each JavaScript, a new evasion can be created. Thus, standard signature detection techniques that use static signatures may fail to detect the malicious code.

The communication system for detection of malicious scripting language code of FIG. 1 resolves many of the aforementioned issues (and more). When an object with scripting language code is received by a security device in network traffic, the scripting language code, such as JavaScript, is extracted. Although communication system 100 could accommodate other forms of scripting language, for ease of reference, 'JavaScript' will be referred to herein to describe various aspects of the embodiments. Heuristics are applied during compilation of the JavaScript code to detect potential evasion techniques used by an attacker. Evasion techniques could include encoding, decoding and/or calculations used to hide data or code in the script. If any of these evasion techniques are detected, a compilation event is raised and information associated with the event may be stored and correlated with other events during a post evaluation analysis.

After the JavaScript is compiled, the compiled script is executed while monitoring calls to certain functions (referred to herein as 'relevant functions'), which are often used to aid an attacker in evasive design and obfuscation of a script. A heuristics and trigger based mechanism can capture the flow at interesting points. Interesting points in the execution can include events that indicate the executing script is potentially malicious. Such events can include functions that indicate obfuscation of the code, such as code performing heap spray. Another interesting point includes the identification of shellcode, which is malicious code used by an attacker to execute on an infected end host. Information associated with the events may be stored for post execution analysis. The event information, associated with compilation events and/or execution events, can be correlated to verify malicious behavior. Capturing the behavior of JavaScript and correlating event information can reveal the essence of the flow of the JavaScript, which can help determine whether the JavaScript intends to take any malicious actions.

Figure 2:
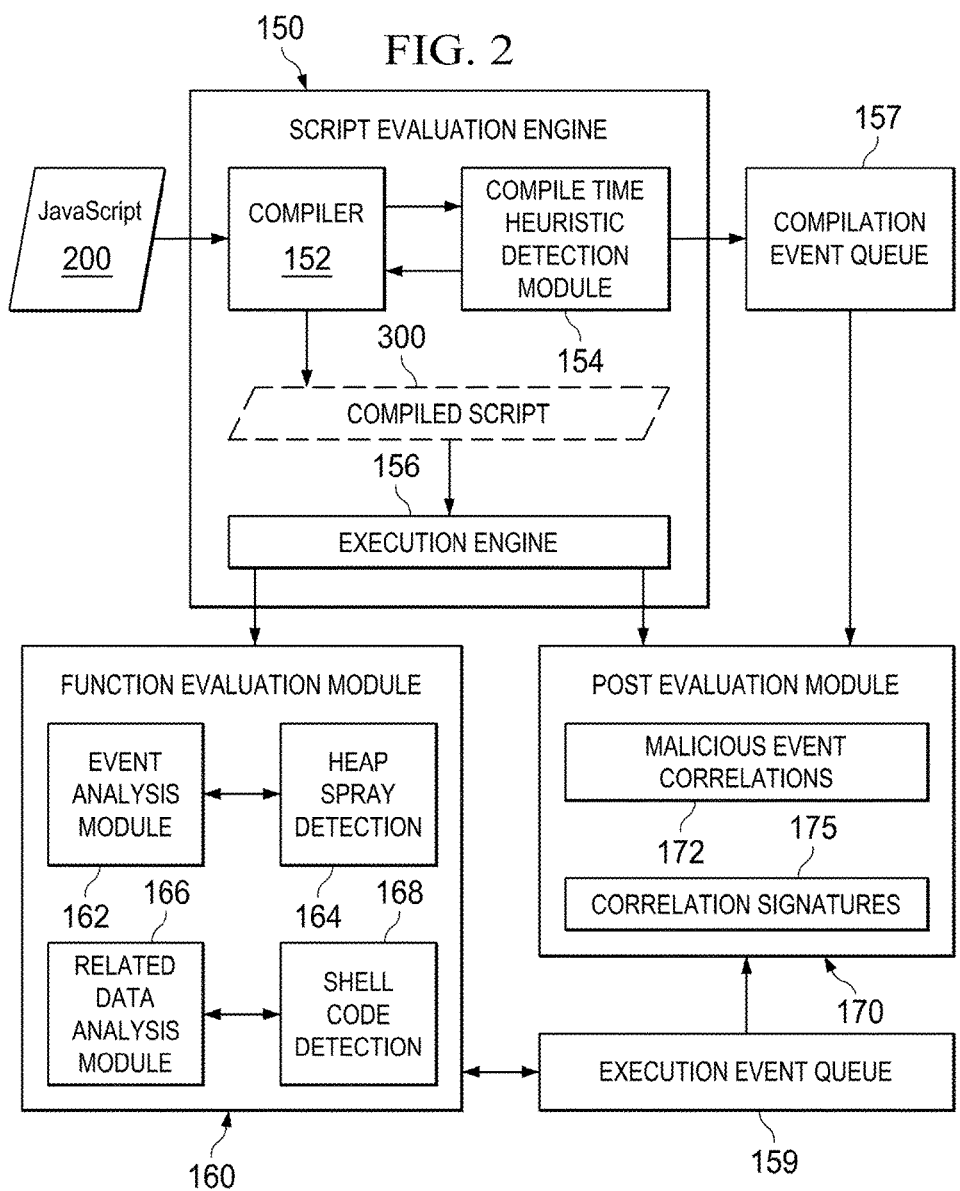
FIG. 2 is a simplified block diagram illustrating additional details of the system according to an example embodiment.

Turning to FIG. 2, FIG. 2 is a simplified block diagram illustrating one possible set of details associated with communication system 100. Script evaluation engine 150 can include a compiler 152, a compile time heuristic detection module 154, and an execution engine 156. Compiler 152 can receive an input file, such as JavaScript 200 and, after compiling the input file, can supply a compiled script 300 to execution engine 156. Before the compiled script is provided to execution engine 156, compile time heuristic detection module 154 can perform heuristic detection of evasion and/or obfuscation techniques during compilation and can add detected compilation events to compilation event queue 157. Execution engine 156 can interact with function evaluation module 160 and post evaluation module 170. Function evaluation module 160 can include event analysis module 162 and related data analysis module 166, which can perform heap spray detection 164 and shellcode detection 168, respectively. Function evaluation module 160 can add information associated with detected execution events to execution event queue 159. Post evaluation module 170 can perform malicious event correlations 172 based on correlation signatures 175 and information from compilation event queue 157 and execution event queue 159. Before discussing potential flows associated with the architectures of FIG. 1-2, a brief discussion is provided about some of the possible infrastructure that may be included in communication system 100.

Generally, communication system 100 can be implemented in any type or topology of networks. Network 115 and wide area network 110 each represent a series of points or nodes of interconnected communication paths for receiving and transmitting packets of information that propagate through communication system 100. These networks offer a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term 'data' as used herein, refers to any type of binary, numeric, voice, video, media, textual, or script data, or any type of source or object code, or any other information in any appropriate format that may be communicated from one point to another in electronic devices and/or networks. An object is intended to include any software file or other data comprising at least some instructions that can be understood and processed by a computer. Objects can include, for example, executable files, library modules, object code, source code, other executable modules, script files, interpreter files, PDF files with embedded script such as JavaScript, HTML files with embedded script such as JavaScript, etc.

In a possible embodiment, communication system 100 includes security device 130 for receiving objects in network traffic being communicated between end hosts 120 and other end hosts via wide area network 110 or any other network. Security device 130 can be a network element that is meant to encompass routers, switches, gateways, bridges, loadbalancers, firewalls, inline service nodes, proxies, servers, appliances, processors, modules, or any other suitable device, component, element, or proprietary device operable to exchange information in a network environment. This network element may include any suitable hardware, software, components, modules, engines, or interfaces that facilitate the operations thereof. This may be inclusive of appropriate algorithms and communication protocols that allow for the effective exchange of data.

End hosts 120 are intended to include any electronic device, component, or element capable of performing voice, audio, video, media, and/or data exchanges within communication system 100 via some network. End hosts are inclusive of personal computers, laptops, mobile devices, smart appliances, and other Internet connected devices (e.g., television, digital video recorder (DVR), set-top box, Internet Radio Device (IRD), etc.). Mobile devices are intended to include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, etc. End hosts may also represent network elements, such as servers, that can receive objects via wide area network 110 or some other network. An end host may function as a source node and/or as a destination node of network traffic.

In various embodiments, security device 130 includes logic (and/or reciprocating logic) that can coordinate, manage, or otherwise cooperate in order to achieve detection of malicious scripting language code, as outlined herein. Note that each of these elements can have an internal structure (e.g., a processor, memory element, etc.), as further described herein, to facilitate some of the detection operations. The logic of the detection activities may be implemented as software, hardware, firmware, or any suitable combination thereof. Additionally, these elements may include any suitable algorithms, hardware, firmware, software, components, modules, engines, interfaces, or objects that facilitate the operations thereof.

In some embodiments, some or all of the detection activities may be provided external to these elements (e.g., external to security device 130), included in other devices to achieve these intended functionalities, or consolidated in any appropriate manner. In one example implementation, the functionality provided by script evaluation engine 150, function evaluation module 160, and/or post evaluation module 170 may be provided in a cloud network accessible via wide area network 110 (e.g., the Internet) or any other network. In another example implementation, the functionality provided by script evaluation engine 150, function evaluation module 160, and/or post evaluation module 170 may be provided in one or more end hosts 120 or any another network element of network environment 115.

Compilation event queue 157, execution event queue 159, and correlation signatures 175 may be configured as one or more queues, caches, tables, lists, databases or any other suitable storage structure, or any suitable combination thereof. Compilation event queue 157, execution event queue 159, and correlation signatures 175 may be internal to security device 130 or external (entirely or in part) using, for example, some network storage technique such as network attached storage (NAS) or storage area network (SAN). Alternatively, these memory elements may be configured in other network elements or end hosts with script evaluation engine 150, function evaluation module 160, and/or post evaluation module 170.

Security device 130 may contain a standard detection module 140, for evaluating certain patterns known to be potentially malicious. In one example, standard detection module 140 calculates a signature (or multiple signatures) of a received object and determines whether the object contains malicious code based on a comparison of the calculated signature and known malicious signatures.

If the object passes the standard detection mechanisms, then preprocessing module 145 can preprocess the object to obtain script portions, such as JavaScript 200, from the object. Preprocessing may include prefiltering, extraction, decompression, and sanitization of the object, such that JavaScript 200 is essentially configured for transmission to, for example, end host 120. Initially, the object can be extracted from the wire and made into the original format that end host 120 would receive. The object can be parsed to find JavaScript code (e.g., by finding less than and greater than signs). The identified script and other relevant information (e.g., event based trigger functions, forms, metadata for PDF files, etc.) can be extracted. Additionally, if any portions of the object are compressed, then security device 130 may decompress those portions to get the exact code of the JavaScript.

Script evaluation engine 150 emulates the execution of JavaScript 200 in an isolated environment to determine whether it contains malicious code. The script evaluation engine includes compiler 152 and execution engine 156 to create a minimal execution environment that allows JavaScript 200 to work as if it is executing in a real application.

During compilation, compiler 152 may generate a tree structure such as Abstract Syntax Tree (AST) to represent JavaScript 200. Compiler 152 transforms JavaScript 200 into another computer language, often referred to as 'object code' and referenced in FIG. 2 as compiled script 300. Compiled script 300 can be executed by execution engine 156.

In example embodiments herein, compile time heuristic detection module 154 cooperates with compiler 152 during compilation to detect, based on one or more criteria, certain evasion and/or obfuscation techniques often used in malicious code. Evasion techniques can be used to obfuscate the malicious code, thus making detection more difficult. One evasion technique involves encoding or decoding to change the presentation of the malicious code. When encoding is used, a readable format of JavaScript 200 may be encoded into some other format. In an example scenario, encoding may be used by an attacker to generate JavaScript. When the JavaScript is executed, it could contain functions to decode data to obtain malicious shellcode. Another evasion technique that can be evaluated during compilation involves using calculations to obtain a value needed for malicious activity. A value may be hidden by representing it in a different form. To obtain the desired value for the malicious code, calculations can be performed on one or more different forms.

Evasion techniques typically use certain function calls to accomplish their objectives. Generally, a function is a block of code or logic that is executed when the function is called. Certain functions that can be used in an evasion technique and that meet one or more other criteria, may be compilation events and may be detectable by compile time heuristic detection module 154. For instance, compile time heuristic detection module 154 can examine JavaScript 200 and may identify certain function reassignments and overly long variable names that could indicate evasion and/or obfuscation. Such functions could involve encoding or decoding activities (e.g., UNESCAPE JavaScript function) or calculations on different values (e.g., EVAL JavaScript function). This heuristic detection can be accomplished by placing the code inside the code responsible for generating the Abstract Syntax Tree during the compilation.

Compile time heuristic detection module 154 may raise a compilation event if it detects the compilation event. As used herein, 'raising an event' is intended to include adding information associated with the particular event to an appropriate event queue. Thus, raising a compilation event can include adding information associated with a compilation event to compilation event queue 157 for correlation with information associated with other compilation and/or execution events. In an example embodiment, information associated with a compilation event can include an identification of the function that triggered the event, a total number of times the event is detected in the script, an identification of a predetermined sequence of compilation events, and a time and distance of a particular compilation event relative to certain other compilation events in the script. Correlations may be performed after compiled script 300 is executed by execution engine 156. In some instances, however, correlations may be performed during the execution of compiled script 300 by execution engine 156.

Execution engine 156, in script evaluation engine 150, can be a JavaScript engine that allows functions in compiled script 300 to be executed. Execution engine 156 is configured to allow compiled script 300 to be executed as if it was executing in a real application. In an example implementation, code is hooked into the existing functions that JavaScript calls. Thus, execution engine 156 executes this hooked code when a function that is relevant to detecting malicious code during runtime (referred to herein as a 'relevant function'), is called in compiled script 300. Some functions may not be relevant to detecting malicious code and, therefore, may not contain hooks. However, when a relevant function is called in compiled script 300, the hooked code allows execution engine 156 to pass control to function evaluation module 160.

If a relevant function is called during the execution of compiled script 300, execution engine 156 transfers relevant data to function evaluation module 160. The relevant data may include an identification number to determine the function and context of current execution. Function evaluation module 160 can execute the original code of the relevant function and analyze its behavior for indications of malicious activity. The context of the function and its parameters may be used to analyze its behavior.

Function evaluation module 160 can include one or more modules to perform various analyses to detect different execution events based on one or more criteria. Execution events may be detected by event analysis module 162 and related data analysis module 166 when they evaluate relevant functions. In an example embodiment, an execution event can include 1) a parameter of a function that meets a predefined threshold, 2) a function that can be used for evasion and/or obfuscation techniques, 3) a function that is known with high confidence to be used for malicious behavior, and/or 4) a function that may be used abnormally for malicious behavior if it is used with particular object types. Function evaluation module 160 may raise an execution event if it detects the execution event. Raising an execution event can include adding information associated with the execution event to execution event queue 159. In an example embodiment, information associated with an execution event can include, but is not limited to, an identification of the function that triggered the event, a total number of times the event has occurred in the executing script, an identification of a predetermined sequence of compilation and/or execution events, and a time and distance of a particular execution event relative to certain other execution events in the executing script.

A predetermined sequence of events can define two or more particular events that, when raised during the compilation and/or execution of a script, indicate potentially malicious behavior. Thus, identification of a detected predetermined sequence of events may be stored when a compilation or execution event is raised. A predetermined sequence of events may require the particular events in its definition to occur or execute randomly, or to occur or execute in a specified order. In an example scenario, a predetermined sequence of events may include in its definition two or more events involving the same variable, regardless of when they occur during compilation or when they are executed. In this case, when a second event (compilation or execution) is raised that involves a variable for which a previous event was raised, the predetermined sequence of events can be detected and information (e.g., identification of the sequence) can be added to the appropriate event queue 157 or 159.

In an embodiment, event analysis module 162 can detect and raise execution events related to parameters. An execution event can be raised when one or more parameters are passed to a function and any of the parameters meets a predefined threshold value. In one example, the number of characters in the parameter can be counted. If the number of characters is greater than the predefined threshold value for parameter characters, then an execution event can be raised. Information associated with the raised execution event can be added to execution event queue 159.

In an embodiment, event analysis module 162 can detect and raise execution events related to evasion and/or obfuscation techniques. One evasion technique that may be analyzed during runtime, in addition to compile time, involves encoding and/or decoding to change the presentation of the malicious code. If an encoding or decoding function is used on a large string and the length of the resulting string is greater than a predetermined threshold length, then an execution event may be raised. For example, if an UNESCAPE JavaScript function is called and the resulting string length is greater than 700 binary/raw bytes, then an execution event may be raised. Accordingly, information associated with the raised execution event can be added to execution event queue 159.

Another evasion technique that may be analyzed during runtime, in addition to compile time, involves calculations of expressions. If a calculation is performed on an expression, then the result may be used to point to another string that is part of malicious code or used by malicious code. Thus, if a calculation function is executed, and the data size is greater than a predetermined threshold size, then an execution event may be raised. For example, if an EVAL JavaScript function is called and the EVAL data is greater than 1024 binary/raw bytes, then an execution event may be raised. Accordingly, information associated with the raised execution event can be added to execution event queue 159.

Another evasion technique that can be analyzed during runtime involves pointers to a string of data or to a variable, where a portion of the string or variable contains shellcode. The pointer can indicate a byte location within the string (e.g., byte location 1000 for 20 bytes of a 2000 byte string) or within the variable. The designated bytes may contain the shellcode, which can be extracted and executed by using this information. Alternatively, this technique could be used to extract the shellcode from a location within a string or variable and then concatenate it with other chunks of shellcode stored in other locations. Specific examples of functions that may use pointers as an evasion technique include STRINGFROMCHARCODE, CHARCODEAT, or CHARAT JavaScript functions. Because the use of these functions for evasion and/or obfuscation purposes is so prevalent, the execution alone of these functions may be configured as an execution event. Thus, in some embodiments, when these functions are executed, an execution event may be raised without meeting a threshold parameter. Information associated with the raised execution event can be added to execution event queue 159 and the execution events may be correlated with other raised events later.

Yet another evasion technique involves dividing shellcode (i.e., malicious code) into different chunks of code and storing the chunks in different locations. The chunks can be concatenated later into one piece of code. The multiple chunks of code in various locations diminish the chances of detection. When a concatenation function for strings is called, it may be raised as an event if the final length of the concatenated string meets a predetermined threshold length. For example, if a STRCAT JavaScript function is called and a resulting length of the concatenated string is greater than 2*1024 bytes, then an execution event may be raised. Accordingly, information associated with the raised execution event can be added to execution event queue 159.

An evasion technique that is similar to the string concatenation technique involves concatenating arrays. Arrays may be concatenated to more efficiently flush a very large amount of memory with desired data. In a particular scenario, heap spray is a malicious technique in which No Operation (NOP) instructions are stored in a large chunk of memory and malicious code is stored somewhere within that chunk. The probability of success for the heap spray increases as the number of NOP instructions stored in memory increases. Concatenating arrays is an efficient way to store NOPs in a very large chunk of memory. Thus, if an array concatenation function is called, it may be raised as an execution event if the final length of the concatenated arrays meets a predetermined threshold length. For example, if an ARRAY.CONCAT JavaScript function is called and a resulting length of the concatenated array is greater than 2*1024 bytes, then an execution event may be raised. Accordingly, information associated with the raised execution event can be added to execution event queue 159.

Encoding NOPs may also be used as an evasion technique to avoid detection. Therefore, if a decoding function is detected and results in characters known to be NOP instructions or other do-nothing instructions, then an execution event may be raised. In a particular example, if an UNESCAPE JavaScript function is used and the resulting characters are 0x9090, 0x4141, or 0x0c0c, then an execution event may be raised. Accordingly, information associated with the raised execution event can be added to execution event queue 159.

Another way of achieving evasion involves constructing a string and replacing some data in a location within the string, where the data is malicious code or is ultimately transformed into malicious code. In this scenario, at any given time, a pattern match of the string will not produce a match with the known malicious code. Therefore, if a replacement function is called, and the length of the replaced data meets a predetermined threshold length, then an execution event may be raised. For example, if a REPLACE JavaScript function is called, and the length of the replaced data is greater than 512 bytes, then an execution event may be raised. Accordingly, information associated with the raised execution event can be added to execution event queue 159.

In an embodiment, related data analysis module 166 of function evaluation module 160 can detect and raise execution events when a function is called and the function is known with high confidence to be used for malicious activities. One example of a high confidence function is one that performs dynamic function creation. Generally, when JavaScript is downloaded through a webpage or a PDF object, if JavaScript is embedded in the object, it is typically very simple. For example, such JavaScript may be configured to help render an HTML page. Dynamic functions are not generally needed to render any content and, therefore, dynamic functions are a high indication of malicious behavior. Thus, when a dynamic function creation is detected, an execution event may be raised and information associated with the dynamic function creation may be stored in execution event queue 159. In an embodiment, the function body itself may also be raised and stored.

Another example of a high confidence function is a shellcode exploitation of the vulnerabilities on an end host. Related data analysis module 166 can perform shellcode detection 168 to determine whether the executing function is configured to exploit vulnerabilities on an end host. An example of such exploitation involves gaining control over a software application associated with the object containing the JavaScript being evaluated. For example, if JavaScript 200 is embedded in a PDF object, then an Adobe PDF reader may be used on the destination end host to read the PDF object. If the Adobe PDF reader contains any vulnerabilities, then a malicious JavaScript function may gain control over the reader, potentially crash the reader, and/or infect the system of the end host that runs the Adobe PDF reader.

To accomplish a shellcode exploitation as described, JavaScript 200 may contain shellcode that allows malicious code to run as a native command instruction within an end host having a particular processor. For instance, malicious code that exploits an end host's vulnerabilities may be written in a format that contains instructions that are understandable by the particular processor of the end host. Thus, the end host is capable of executing, and thus being controlled by, the malicious code.

In an embodiment of shellcode detection 168, the compiled script itself may be examined. If compiled script 300 contains any instructions that are understandable to the particular processor of a destination end host, then this is a function that indicates a high confidence of malicious software and therefore, is an execution event. The execution event can be raised and information associated with the execution event may be stored in execution event queue 159. Any suitable known mechanisms (e.g., pluggable third party library) may be used, for example, by related data analysis module 166, to detect the shellcode.

In an embodiment, event analysis module 162 can further detect and raise execution events related to functions used with particular object types. In an embodiment, certain JavaScript functions that are used with HyperText Markup Language (HTML) objects may be raised as execution events. Certain JavaScript functions may be used within an HTML file to generate data and/or scripts and to write them back into the current file being downloaded 'on-the-fly'. The data and/or scripts may be evaluated based on a predetermined threshold value, such as length, and the corresponding function may be raised as an execution event. In one example implementation, if this type of JavaScript function is called and the length of the written data is greater than 5*1024, then an execution event may be raised. Accordingly, information associated with the execution event may be added to execution event queue 159. In addition, execution engine 156 can process additional script if the written data contains script, in order to evaluate the function.

Another execution event that may be raised in certain implementations includes a function without a script tag. Script tags define JavaScript sections to be extracted and executed. Within the script tags, certain variables are defined to indicate the format the script has to follow in order for a browser or PDF Reader to understand the code so that it can be executed. If a script tag is missing, then the browser may not be able to understand the format and the execution may either fail or malfunction. This event may be raised, or may be raised only if a particular object already has an anomaly or other events.

In an example embodiment, event analysis module 162 of function evaluation module 160 may also perform heap spray detection 164, based on other raised execution events. This analysis may be performed during the execution of compiled script 300, as it may be more efficient to raise an alert as soon as a high confidence correlation signature is verified based on the raised events. In other embodiments, however, the heap spray detection could be performed after compiled script 300 has finished executing. In these embodiments, it may be performed with other correlation signature checks in post evaluation module 170.

Heap spray is a technique that is widely used to increase the successfulness of the execution of native code that carries the shellcode on the processor of the end host. Shellcodes can exploit a vulnerability on an end host using a buffer overflow. A buffer overflow can occur when a buffer is defined, a function is called, and then a return address is pushed into the buffer. Typically, overflow techniques have been used to change the return address and store a malicious shellcode in the location indicated by the new return address. Thus, when the function is returned, it is returned to the location of the malicious shellcode. Current security mechanisms, however, render this technique difficult to accomplish by an attacker.

The heap spray technique helps circumvent the inability of attackers to use the buffer overflow technique. Heap sprays copy a large chunk of NOP (i.e., shortened for 'No Operation') instructions into memory, along with shellcode. A NOP instruction is an assembly language instruction that effectively does nothing. In a heap spray, the memory is flushed with NOP instructions and the attacker's shellcode is embedded into part of that memory. Although a fixed return address may not be used by an attacker to overflow the original return address, the chances of returning to a certain piece of memory with a NOP instruction may be significant. This is particularly true if the NOP instructions consume a large range of memory.

In an embodiment, event analysis module 162 is configured to detect heap spray actions during execution of compiled script 300. A heap spray is detected when information in execution event queue 159 indicates that a string concatenation function has been called multiple times and that the length of a resulting concatenated string meets a predetermined threshold length. For example, if STRCAT JavaScript function has been called multiple times, and if the resulting string length is greater than 3*1024, then a heap spray execution event is raised. Variables may control this determination. In an example embodiment, the variables may be stored in, or linked to, execution event queue 159. If a heap spray execution event is detected, then appropriate actions may be taken and the execution of compiled script 300 may be terminated in some embodiments.

After function evaluation module 160 completes its evaluation of a function, control may return to execution engine 156. Control may be passed back to function evaluation module 160 each time a relevant function of compiled script 300 is called. Once all of the functions of compiled script 300 have completed evaluation and execution, post evaluation module 170 may provide post evaluation analysis.

Post evaluation module 170 may perform malicious event correlations 172 based on correlation signatures 175 and on event information in compilation event queue 157 and execution event queue 159. In an embodiment, correlation signatures define various combinations of event information. Each combination has been determined to indicate that a script with that particular combination of compilation and/or execution events is malicious. Event information can include, for example, the number of occurrences of the event, the time and location of the occurrences of the event relative to other events, and/or the weight assigned to each function that triggered the event. Malicious event correlations 172 includes evaluating event information in event queues 157 and 159 based on correlation signatures 175, to determine whether the JavaScript, and therefore, its corresponding object, is malicious.

In an embodiment, some correlation signatures may be permanent when the correlation signature is a fixed correlation signature. In an example, a fixed correlation signature may include pointer functions that are called a predetermined threshold number of times. For example, a fixed correlation signature may indicate that a JavaScript is malicious if CHARAT, CHARCODEAT, and/or STRINGFROMCHARCODE JavaScript functions are called more than 5 times. In another example, a fixed correlation signature may include events related to encoding, decoding and/or calculation functions. For example, a fixed correlation signature may indicate that a JavaScript is malicious if a first event was raised for an encoding/decoding function (e.g., UNESCAPE JavaScript function) that resulted in a large amount of data and another event was raised for a calculation function (e.g., EVAL JavaScript function) that occurred within 5 events of the encoding/decoding event. In a further example, a fixed correlation signature may indicate a malicious JavaScript if an execution event for a dynamic function creation occurred within a certain distance (e.g., number of events) of an execution event corresponding to a replacement function. For example, a fixed correlation signature may provide that a JavaScript function is malicious if an execution event was raised for a dynamic function creation within 2 events of an event that was raised for a REPLACE JavaScript function, where the replaced data in the string met a predetermined threshold length (e.g., >512 bytes).

The particular examples provided herein for various relevant functions, predetermined threshold values, and correlation signatures are intended for illustrative purposes and are not intended to be limiting. It will be apparent that the concepts of the present disclosure may be applied to many different functions and threshold values of those functions. Similarly, the concepts provided herein may be applied to define many different correlation signatures by using various combinations of execution and/or compilation events. Moreover, the concepts may be further applied to other JavaScript functions (or other scripting language functions), not specifically enumerated herein. Finally, the relevant functions and corresponding threshold values that trigger an execution event and/or a compilation event may be configured by a manufacturer, an end user, or both. Similarly, the combinations of events that define correlation signatures could be configured by a manufacturer, an end user, or both.

Figure 3:
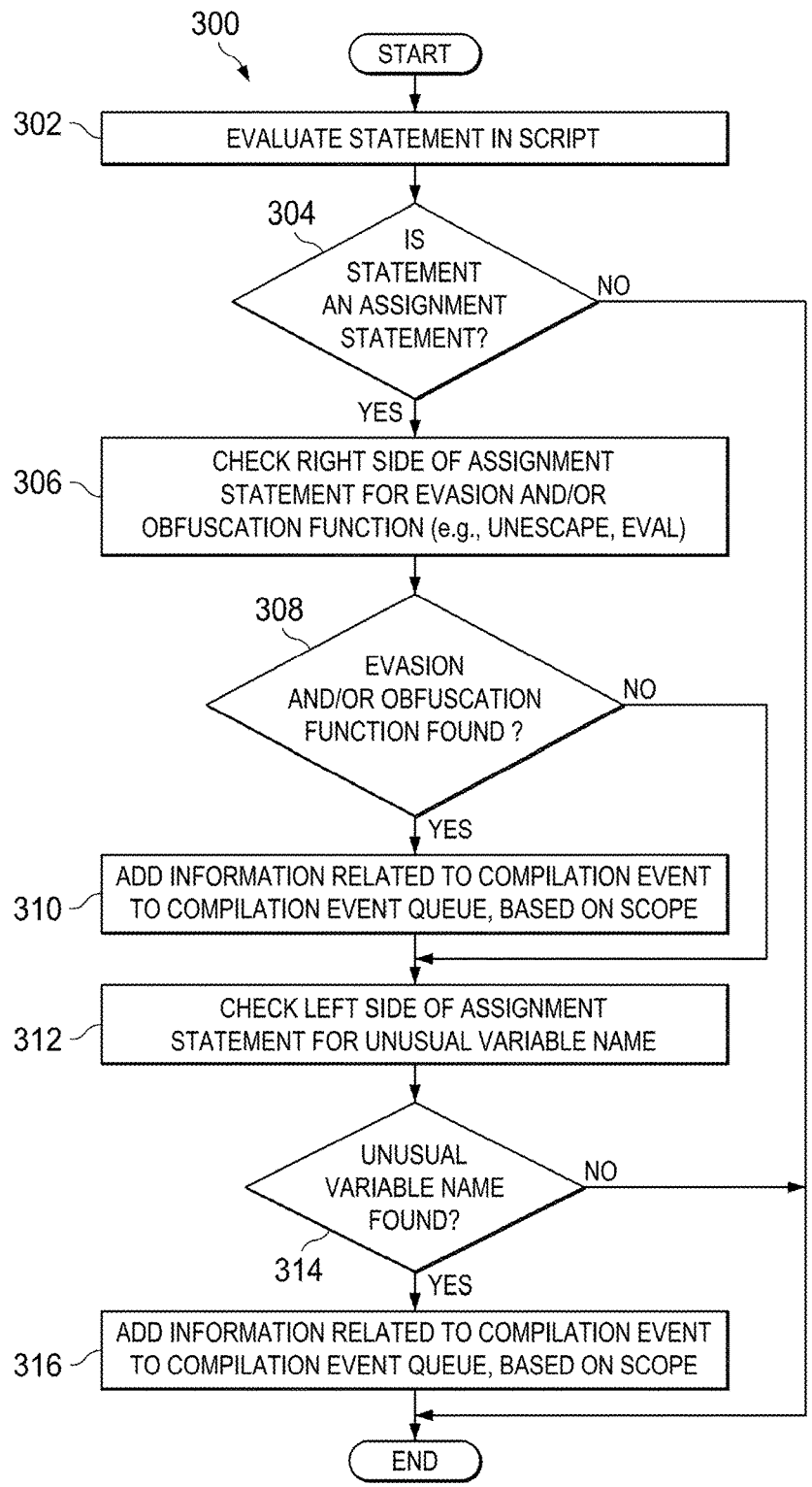
FIG. 3 is a simplified flow chart illustrating example operations that may be associated with embodiments of the present disclosure.

Turning to FIG. 3, a flow chart illustrates a flow 300 of activities that may be performed, at least in part, by compile time heuristic detection module 154 of script evaluation engine 150. Flow 300 may be performed during the compilation of JavaScript 200 by compiler 152. In one example embodiment, flow 300 may be performed for each statement in JavaScript 200.

At 302, compile time heuristic detection module 154 evaluates a statement in a script, such as JavaScript 200 in order to an detect a compilation event based on at least one criterion, which could be a right side value or a left side variable of an assignment statement. If it is determined, for example at 304, that the statement is not an assignment, the flow may end. However, if the statement is an attempt to reassign variables, then at 306, the right side value of the assignment statement can be evaluated to determine whether the right side value is generated from an evasion and/or obfuscation function. An evasion and/or obfuscation function could be an encoding/decoding function that transforms data from one format to another format (e.g., UNESCAPE JavaScript function). Another evasion and/or obfuscation function could be a calculation function that performs calculations on expressions or values (e.g., EVAL JavaScript function). If an evasion and/or obfuscation function is found on the right side of the assignment statement, as determined at 308, then a compilation event can be raised by adding, at 310, information associated with the compilation event to compilation event queue 157. The information associated with the compilation event may be based on a scope of the variable to which a value is being assigned in the assignment statement. The scope can indicate whether the variable is local (i.e., for one function only) or global (i.e., throughout the script) in the script. Additionally, if multiple evasion and/or obfuscation functions are found in assignment statements, then multiple compilation events can be raised.

At 312, the left side of the assignment statement can also be evaluated to determine whether the variable name is unusual. Generally, a variable name may be identified as unusual based on its length (e.g., greater than a predetermined threshold value) or based on its randomness. Both length and randomness could indicate a variable name that was created by a malicious algorithm rather than a legitimate programmer. These examples are not intended to be limiting, and it will be apparent that other characteristics of a variable name may also indicate malicious behavior. If the variable name is determined, at 314, to be unusual, then a compilation event can be raised by adding, at 316, information associated with the compilation event to compilation event queue 157. The information may be based on a scope of the variable in the assignment statement. The scope can indicate whether the variable is local or global in the script. Additionally, if multiple unusual variable names are found in assignment statements, then multiple compilation events can be raised.

In some embodiments, another check may be performed. The right side value of an assignment statement could potentially be evaluated to determine whether the right side value is abnormally long. If the right side value is determined to be abnormally long (e.g., greater than a predetermined threshold length), then a compilation event could be raised by adding information associated with the event to compilation event queue. The information could be based on a scope of the variable to which a value is being assigned in the assignment statement. In other embodiments, however, this check may not be performed during compilation. Instead, similar evaluations may be performed during the execution of the compiled script, as will be further described herein with reference to FIG. 5.

Figure 4:
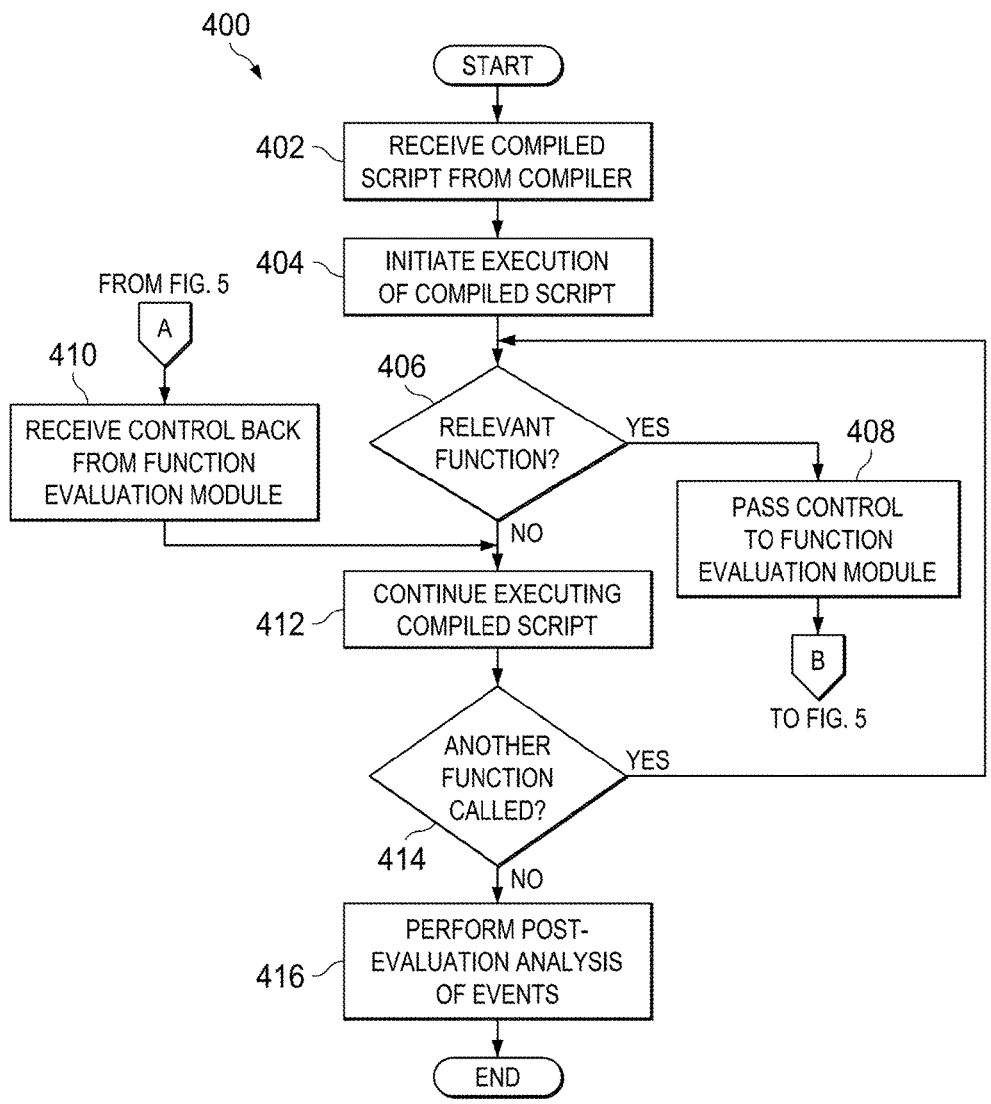
FIG. 4 is a simplified flow chart illustrating additional example operations that may be associated with embodiments of the present disclosure.

Turning to FIG. 4, a flow chart illustrates a flow 400 of activities that may be performed, at least in part, by execution engine 156 of script evaluation engine 150. Flow 400 may be performed when it receives compiled script 300 from compiler 152.

At 402, execution engine 156 receives compiled script 300 (e.g., executable JavaScript) from compiler 152. At 404, execution engine 156 initiates execution of the compiled script. At 406, a determination is made as to whether a function that is called is relevant to the analysis for malicious code. In an embodiment, this determination can be made based on whether code is hooked into the function, resulting in control being passed away from the execution engine at the beginning of the function.

If the function is relevant, then at 408, the hooked code may pass control to function evaluation module 160, indicated by B in FIG. 4. Once the function evaluation module has finished its evaluations, at 410, execution engine 156 receives control back from function evaluation module 160, indicated by A in FIG. 4. Once execution engine 156 receives control back, or if the function is not relevant (e.g., the function does not contain a code hook) as determined at 406, then at 412, execution engine 156 can continue executing the compiled script.

At 414, a determination is made as to whether another function is called in the compiled script. If another function is called, then flow may pass back to 406. Control can be passed to function evaluation module 160 if the function is relevant to detecting malicious code and, therefore, contains a hook to function evaluation module 160. This processing may continue for each relevant function called in compiled script 300. When no more functions are called at 414, then all of the functions of the compiled script have been executed and a post evaluation analysis of compilation and execution events may be performed at 416.

Figure 5:
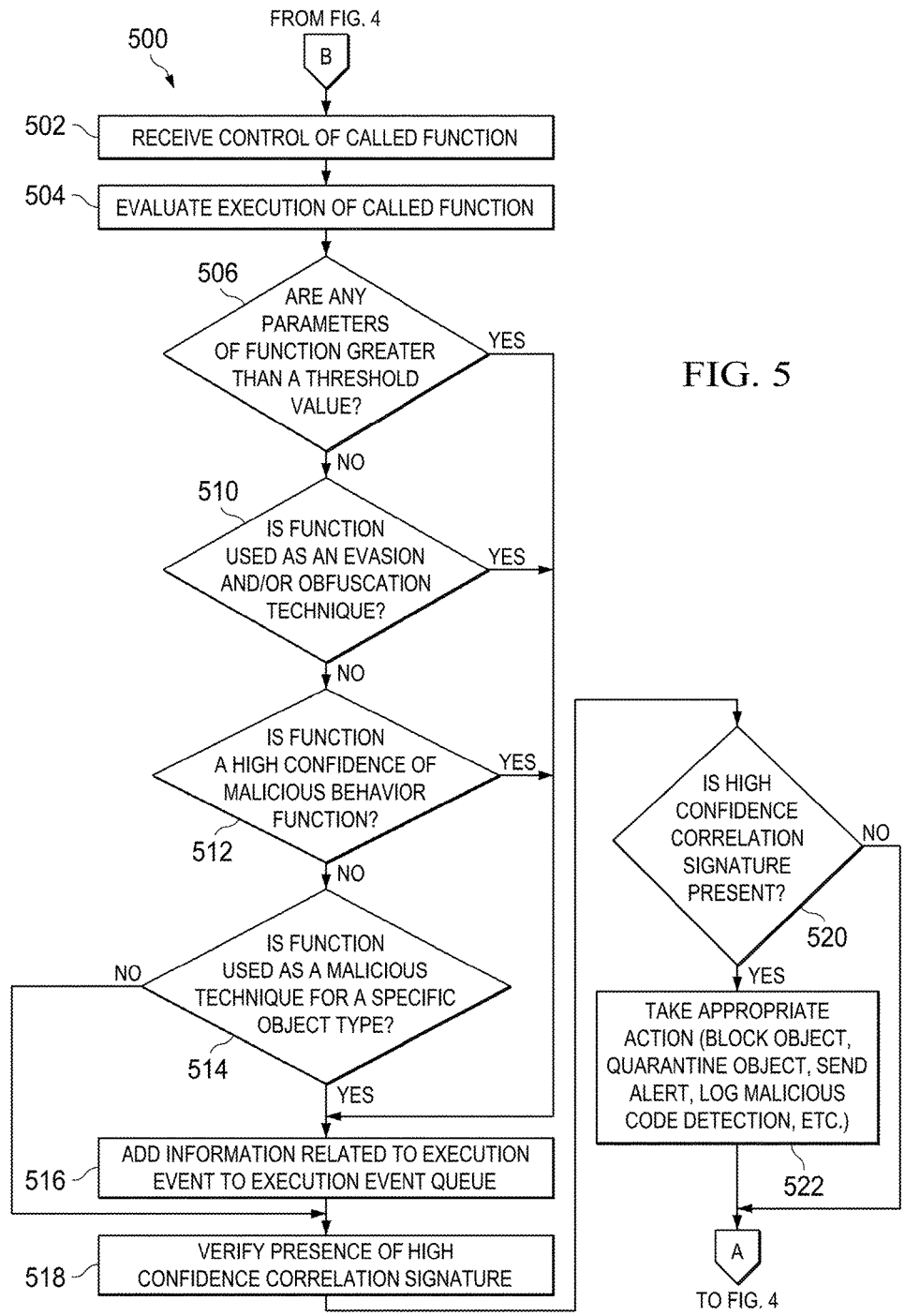
FIG. 5 is a simplified flow-chart illustrating further example operations that may be associated with embodiments of the present disclosure.

In FIG. 5, a flow chart illustrates a flow 500 of activities that may be performed, at least in part, by function evaluation module 160. In an embodiment, flow 500 may be performed when hooked code in a relevant function passes control from execution engine 156 to function evaluation module 160 as indicated by B in FIG. 5.

At 502, function evaluation module 160 receives control of a relevant function (e.g., a JavaScript function that has been hooked) called in compiled script 300 as the compiled script is executing in execution engine 156. At 504, the execution of the called function may be evaluated in order to an detect an execution event based on at least one criterion (e.g., the type of function, a predetermined threshold value). At 506, it is determined whether any parameters passed into the function have a length that is greater than a predetermined threshold. If such parameters are found, then an execution event may be raised at 516 by adding information related to the parameter execution event to execution event queue 159.

If no parameters meet the threshold value, then at 510, it is determined whether the called function uses any evasion and/or obfuscation techniques. For example, JavaScript functions that could be used for evasion and/or obfuscation techniques as previously described herein include, but are not limited to: UNESCAPE, EVAL, STRCAT, STRINGFROMCHARCODE, CHARCODEAT, CHARAT, ARRAY.CONCAT, UNESCAPE, and REPLACE. If the called function is an evasion or obfuscation function and if the function meets other required criteria for that particular function (e.g., predetermined threshold values such as lengths, sizes, etc.), then an event may be raised at 516 by adding information related to the evasion and/or obfuscation execution event to execution event queue 159.

If the called function is not an evasion or obfuscation function, or if the called function is an evasion or obfuscation function but does not meet its respective other criteria (e.g., meeting a threshold value), then at 512, it is determined whether the function is a high confidence of malicious behavior function. For example, JavaScript functions with a high confidence of malicious behavior, as previously described herein, include but are not limited to: functions that result in Dynamic Function Creation, and Shellcode Detection. If the called function is a function with a high confidence of malicious behavior, then an execution event may be raised at 516 by adding information related to the high confidence execution event to execution event queue 159.

If the called function is not a high confidence function, then at 514, it is determined whether the function is one that could be used abnormally for a specific object type, such as HTML. For example, certain JavaScript functions that may be used as a malicious technique with HTML include functions used within an HTML file to generate large amounts of data and/or scripts and to write the large amounts of data and script data back into the current file being downloaded 'on-the-fly'. If the called function is a function that may be used abnormally as a malicious technique with a specific object type such as HTML, and if the function meets any other required criteria, then an execution event may be raised at 516 by adding information related to the specific object type execution event to execution event queue 159.

Once the evaluation is completed for the particular called function, then at 518, prior to passing control back to execution engine 156, a verification may be performed to determine the presence of a high confidence correlation signature. For example, the verification can determine whether event information in event queues 157 and 159 matches a high confidence correlation signature, such as a correlation signature for a heap spray. If it is determined that the high confidence correlation signature is present at 520, then at 522 any appropriate action may be taken. For instance, the object corresponding to the script may be blocked or quarantined. Also an alert may be sent, a log of malicious code detection may be recorded, etc. Once flow 500 is finished executing, control may be passed back to execution engine 156, as indicated by A in FIG. 5.

Figure 6:
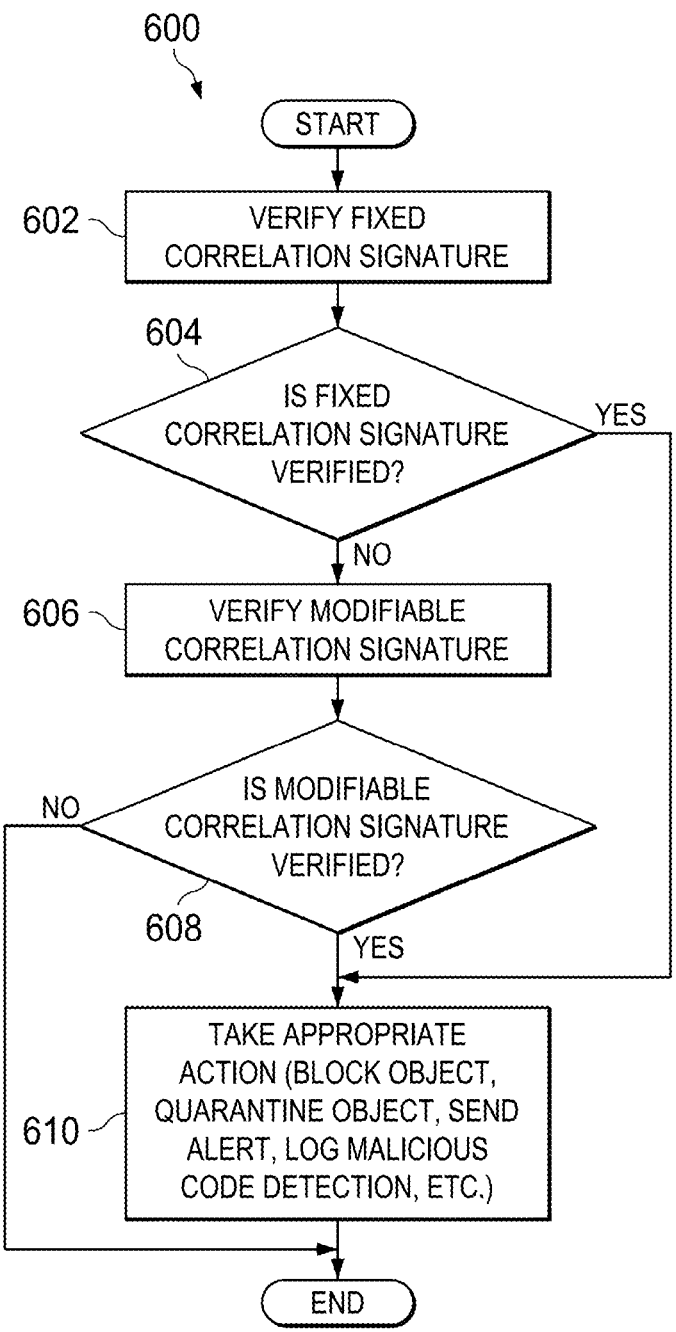
FIG. 6 is a simplified flow-chart illustrating yet further example operations that may be associated with embodiments of the present disclosure.

In FIG. 6, a flow chart illustrates a flow 600 of activities that may be performed, at least in part, by post evaluation module 170. In an embodiment, flow 600 may be performed when all of the functions in compiled script 300 have been executed by execution engine 156.

At 602, event information from event queues 157 and 159 can be correlated to determine whether the script contains malicious code. This can be achieved by verifying a fixed correlation signature (e.g., from correlation signatures 175) based on the event information from compilation event queue 157 and/or execution event queue 159. For example, one fixed correlation signature could include pointer functions that were called a predetermined threshold number of times. Another fixed correlation signature could include encoding and/or decoding functions within a predetermined location of calculation functions. Yet another fixed correlation signature could include a dynamic function creation occurring within a time and distance of a replacement function. If a fixed correlation signature is verified at 604, then at 610, any appropriate action may be taken (e.g., block object, quarantine object, send alert, log malicious code detection, etc.).

If, however, a fixed correlation signature is not verified at 604, then at 606, a modifiable correlation signature (e.g., from correlation signatures 175) can be verified. Modifiable correlation signatures may be configurable by a user and/or may include default correlation signatures. If a modifiable correlation signature is verified at 608, then at 610, any appropriate action may be taken (e.g., block object, quarantine object, send alert, log malicious code detection, etc.). If however, a modifiable correlation signature is not verified at 608, then flow 600 may end, and the compiled script may be considered nonmalicious.

The correlation signatures (both fixed correlation signatures and modifiable correlation signatures) may include particular combinations of events, the number of occurrences of the events, the time and/or location of the occurrences relative to other events, and/or a weight of the functions to determine whether the script is malicious.

Figure 7:
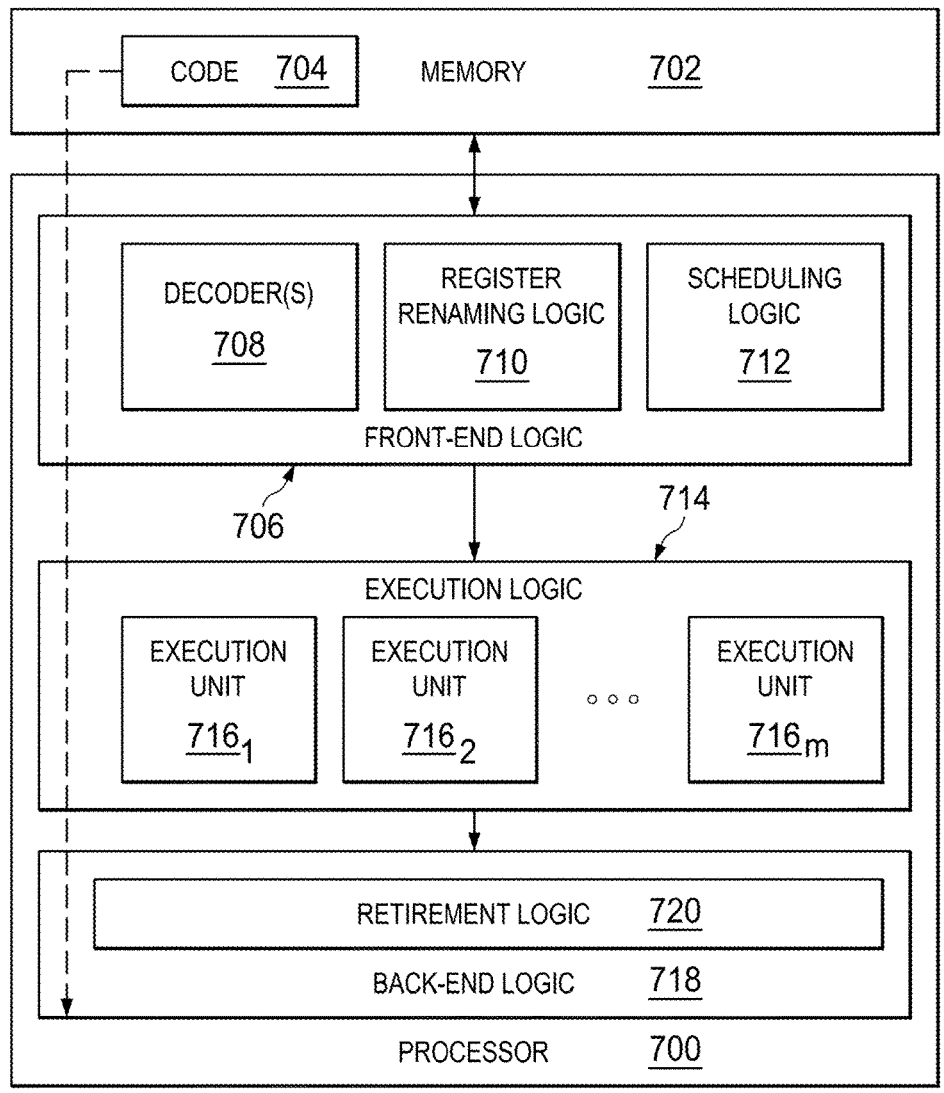
FIG. 7 is a simplified block diagram of an example processor according to an embodiment.

FIGS. 7-8 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 7-8.

FIG. 7 is an example illustration of a processor according to an embodiment. Processor 700 is one example embodiment of processor 180 of security device 130.

FIG. 7 also illustrates a memory 702 coupled to processor 700 in accordance with an embodiment. Memory 702 is one example embodiment of memory element 190 of security device 130. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with operations to detect malicious scripting language code detailed herein. Generally, processor 700 can transform an element or an article (e.g., data) from one state or thing to another state or thing.

Code 704, which may be one or more instructions to be executed by processor 700, may be stored in memory 702. Code 704 can include instructions of various modules (e.g., standard detection module 140, preprocessing module 145, script evaluation engine 150, function evaluation module 160, post evaluation module 170, etc.) that may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units $716_1$ through $716_m$. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

Referring now to FIG. 8, FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems of communication system 100 may be configured in the same or similar manner as computing system 800. For example, security device 130 and end hosts 120, shown and described herein, may be configured in the same or similar manner as exemplary computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations associated with detecting malicious scripting language code, as outlined herein.

Processors 870 and 880 may be any type of processor, such as those discussed with reference to processor 700 of FIG. 7, and processor 180 of FIG. 1. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of detecting malicious scripting language code, as provided herein.

The detection functions of communication system 100, outlined herein, may be implemented by logic encoded in one or more tangible media (e.g., embedded logic provided in an application specific integrated circuit (ASIC), digital signal processor (DSP) instructions, software (potentially inclusive of object code and source code) to be executed by a processor (e.g., processor 180) or other similar machine, etc.). The tangible media may be non-transitory in at least some embodiments. In some of these instances, memory (e.g., memory element 190) can store data used for the operations described herein. This includes the memory being able to store software, logic, code, or processor instructions that are executed to carry out the activities described in this Specification. In an embodiment, the tangible media may be provided in security device 130.

Additionally, the information being tracked, sent, received, or stored in communication system 100 (e.g., execution event information, compilation event information, correlation signatures, etc.) could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of multiple network elements, computing systems, modules, and/or other components. However, this has been done for purposes of clarity and example only. It should be appreciated that the system can be consolidated in any suitable manner. Along similar design alternatives, any of the illustrated modules, nodes, elements, and other components of FIG. 1 may be combined or divided in various possible configurations, all of which are clearly within the broad scope of this Specification. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In other examples, the functions described herein could involve a proprietary element (e.g., as part of an antivirus solution), which could be provided in (or be proximate to) these identified elements, or be provided in any other network element or other device, or be provided as a complementary solution (e.g., in conjunction with a firewall), or provisioned somewhere in the network. In addition, the functions described herein can be consolidated in any suitable manner.

The following examples pertain to embodiments in accordance with this Specification. One or more embodiments may provide a method of detecting malicious code in a script in a network environment. The method may comprise: initiating an execution of a compiled script; evaluating a function called in the compiled script; detecting an execution event based on at least a first criterion; storing information associated with the execution event in an execution event queue; and verifying a correlation signature based on information associated with at least one execution event in the execution event queue.

An example of an embodiment may further comprise: evaluating an assignment statement of a script during compilation of the script by a compiler, wherein the compiled script is generated from the script; detecting a compilation event based on at least a second criterion; and storing information associated with the compilation event in a compilation event queue.

In an example of an embodiment, the verifying the correlation signature is based in part on information associated with the compilation event in the compilation event queue.

In an example of an embodiment, the compilation event queue and the execution event queue are integrated.

In an example of an embodiment, the verifying is performed when the compiled script is executing.

In an example of an embodiment, the verifying is performed when the compiled script has completed the execution.

In an example of an embodiment, the correlation signature is configurable by a user.

In an example of an embodiment, one or more parameters passed to the function during the execution, and the first criterion is based on a predetermined threshold length of any one of the parameters.

In an example of an embodiment, the function encodes or decodes data, and the first criterion is based on a predetermined threshold length of a string resulting from the function.

In an example of an embodiment, the function concatenates data, and the first criterion is based on a predetermined threshold length of a string resulting from concatenated data.

An example of an embodiment further may comprise: responsive to determining the function is a predetermined relevant function, passing control from an execution engine to a function evaluation module when the function is called; and passing control from the function evaluation module to the execution engine when the function finishes executing.

In an example of an embodiment, the information includes one or more of an identification of the execution event, a number of times the execution event has been detected, an identification of a predetermined sequence of events, and a distance between the execution event and one or more other execution events.

In an example of an embodiment, the verifying the correlation signature is based, in part, on a weight assigned to the function, wherein the weight represents a relative importance of the function.

In an example of an embodiment, the second criterion includes evaluating a right side value of the assignment statement.

In an example of an embodiment, the second criterion includes evaluating a left side variable name of the assignment statement.

In an example of an embodiment, the function is one of one or more predetermined relevant functions.

One or more embodiments may provide an apparatus for detecting malicious code in a script in a network environment. The apparatus may comprise: one or more processors; an execution engine configured to execute on at least one of the one or more processors to initiate an execution of a compiled script; and a function evaluation module configured to execute on at least one of the processors to: evaluate a function called in the compiled script; detect an execution event based on at least a first criterion; and store information associated with the execution event in an execution event queue, where a correlation signature is verified based on information associated with at least one execution event in the execution event queue.

In an example of an embodiment, the function evaluation module verifies the correlation signature before the execution of the compiled script is finished.

An example of an embodiment may further comprise: a post evaluation module configured to execute on at least one of the processors to verify the correlation signature after the execution of the compiled script is finished.

An example of an embodiment may further comprise: a compile time heuristic detection module configured to execute on at least one of the processors to: evaluate an assignment statement of a script during compilation of the script by a compiler, where the compiled script is generated from the script; detect a compilation event based on at least a second criterion; and store information associated with the compilation event in a compilation event queue.

In an example of an embodiment, the correlation signature is verified based in part on information associated with the compilation event in the compilation event queue.

In an example of an embodiment, the compilation event queue and the execution event queue are integrated.

In an example of an embodiment, the correlation signature is configurable by a user.

In an example of an embodiment, the execution engine may be further configured to pass a parameter to the function evaluation module, and the first criterion is based on a predetermined threshold length of the parameter.

In an example of an embodiment, the function encodes or decodes data, and the first criterion is based on a predetermined threshold length of a string resulting from the function.

In an example of an embodiment, the function concatenates data, and the first criterion is based on a predetermined threshold length of a string resulting from concatenated data.

In an example of an embodiment, the execution engine may be further configured to, responsive to determining the function is a predetermined relevant function, pass control to a function evaluation module when the function is called; and the function evaluation module may be further configured to pass control to the execution engine when the function finishes executing.

In an example of an embodiment, the information includes one or more of an identification of the execution event, a number of times the execution event has been detected, an identification of a predetermined sequence of events, and a distance between the execution event and one or more other execution events.

In an example of an embodiment, the correlation signature is verified based, in part, on a weight assigned to the function, where the weight represents a relative importance of the function.

In an example of an embodiment, the second criterion includes evaluating a right side value of the assignment statement.

In an example of an embodiment, the second criterion includes evaluating a left side variable name of the assignment statement.

In an example of an embodiment, the function is one of one or more predetermined relevant functions.

One or more embodiments may provide at least one machine accessible storage medium having instructions stored thereon for detecting malicious code in a script in a network environment. The instructions when executed by a processor cause the processor to: initiate an execution of a compiled script; evaluate a function called in the compiled script; detect an execution event based on at least a first criterion; and store information associated with the execution event in an execution event queue; and verify a correlation signature based on information associated with at least one execution event in the execution event queue.

An example of an embodiment may comprise further instructions that when executed by the processor cause the processor to: evaluate an assignment statement of a script during compilation of the script by a compiler, where the compiled script is generated from the script; detect a compilation event based on at least a second criterion; and store information associated with the compilation event in a compilation event queue.

An example of an embodiment may comprise further instructions that when executed by the processor cause the processor to: verify the correlation signature based, in part, on information associated with the compilation event in the compilation event queue.

In an example of an embodiment, the compilation event queue and the execution event queue are integrated.

An example of an embodiment may comprise further instructions that when executed by the processor cause the processor to: verify the correlation signature before the execution of the compiled script is finished.

An example of an embodiment may comprise further instructions that when executed by the processor cause the processor to: verify the correlation signature after the execution of the compiled script is finished.

An example of an embodiment may comprise further instructions that when executed by the processor cause the processor to: permit the correlation signature to be configured by a user.

An example of an embodiment may comprise further instructions that when executed by the processor cause the processor to: pass a parameter to the function during the execution, and the first criterion is based on a predetermined threshold length of the parameter.

In an example of an embodiment, the function encodes or decodes data, and the first criterion is based on a predetermined threshold length of a string resulting from the function.

In an example of an embodiment, the function concatenates data, and the first criterion is based on a predetermined threshold length of a string resulting from concatenated data.

An example of an embodiment may comprise further instructions that when executed by the processor cause the processor to: responsive to determining the function is a predetermined relevant function, pass control from a execution engine to a function evaluation module when the function is called; and pass control from the function evaluation module to the execution engine when the function finishes executing.

In an example of an embodiment, the information includes one or more of an identification of the execution event, a number of times the execution event has been detected, an identification of a predetermined sequence of events, and a distance between the execution event and one or more other execution events.

In an example of an embodiment, the correlation signature is verified based, in part, on a weight assigned to the function, wherein the weight represents a relative importance of the function.

An example of an embodiment may comprise further instructions that when executed by the processor cause the processor to: evaluate a right side value of the assignment statement to determine whether the second criterion has been met.

An example of an embodiment may comprise further instructions that when executed by the processor cause the processor to: evaluate a left side variable name of the assignment statement to determine whether the second criterion has been met.

In an example of an embodiment, the function is one of one or more predetermined relevant functions.

In an example of an embodiment, the evaluation of the function is responsive to determining the function called in the compiled script is a predetermined relevant function.

An example implementation for detecting malicious code in a script in a network environment may include means for initiating an execution of a compiled script; means for evaluating a function called in the compiled script; means for detecting an execution event based on at least a first criterion; means for storing information associated with the execution event in an execution event queue; and means for verifying a correlation signature based on information associated with at least one execution event in the execution event queue. The implementation may also include means for evaluating an assignment statement of a script during compilation of the script by a compiler, where the compiled script is generated from the script; means for detecting a compilation event based on at least a second criterion; and means for storing information associated with the compilation event in a compilation event queue. The means for verifying the correlation signature may be performed before and/or after the execution of the compiled script is finished. The implementation may include, responsive to determining the function is a predetermined relevant function, means for passing control from an execution engine to a function evaluation module when the function is called; and means for passing control from the function evaluation module to the execution engine when the function finishes executing. The implementation may also include means for evaluating a left side value and/or a right side variable name of an assignment statement to determine whether the second criterion has been met. The implementation may include means for passing a parameter to the function during the execution, and means for evaluating a length of the parameter to determine whether the first criterion has been met.

What is claimed is:

1. At least one non-transitory machine accessible storage medium having instructions stored thereon for detecting malicious code in a script, wherein the instructions, when executed by at least one processor, cause the at least one processor to perform a method comprising:
   evaluating a left side variable name of an assignment statement in the script or a right side value of the assignment statement to produce a result indicating a compilation event;
   initiating, by an execution engine, an execution of a compiled script resulting from a compilation of the script;
   detecting a function called by the compiled script;
   executing the function and performing an evaluation of the function;
   detecting an execution event during the evaluation of the function, wherein the execution event is detected based on a parameter passed into the function, a result of the function, data written or replaced by the function, or data calculated by the function at least meeting or exceeding a predetermined threshold length or size; and
   verifying, against a correlation signature defining a combination of events that indicate the script is malicious, a time or a location in the script of an occurrence of the compilation event relative to the execution event.

2. The at least one non-transitory machine accessible storage medium of claim 1, wherein the instructions, when executed by the at least one processor, cause the at least one processor to:
   store first information associated with the compilation event in a compilation event queue; and
   store second information associated with the execution event in an execution event queue.

3. The at least one non-transitory machine accessible storage medium of claim 2, wherein the compilation event queue and the execution event queue are integrated.

4. The at least one non-transitory machine accessible storage medium of claim 1, wherein the correlation signature indicates a threshold number of times the function is called.

5. The at least one non-transitory machine accessible storage medium of claim 1, wherein the correlation signature indicates a location of the execution event relative to another execution event detected during the execution of the compiled script.

6. The at least one non-transitory machine accessible storage medium of claim 1, wherein the correlation signature is configurable by a user.

7. The at least one non-transitory machine accessible storage medium of claim 1, wherein the instructions, when executed by the at least one processor, cause the at least one processor to:
pass the parameter to the function, wherein the execution event is based on a predetermined threshold length of the parameter.

8. The at least one non-transitory machine accessible storage medium of claim 1, wherein the function decodes data, and the execution event is based on a predetermined threshold length of a string resulting from the function.

9. The at least one non-transitory machine accessible storage medium of claim 1, wherein the function concatenates data, and the execution event is based on a predetermined threshold length of a string resulting from concatenated data.

10. The at least one non-transitory machine accessible storage medium of claim 1, wherein the instructions, when executed by the at least one processor, cause the at least one processor to:
prior to executing the function, pass control of the function to a function evaluation module based on detecting code hooked in the function; and
pass control from the function evaluation module to the execution engine when the function finishes executing.

11. The at least one non-transitory machine accessible storage medium of claim 1, wherein the correlation signature is verified based, in part, on a distance between the execution event and one or more other execution events.

12. The at least one non-transitory machine accessible storage medium of claim 1, wherein the correlation signature is verified based, in part, on a weight assigned to the function, wherein the weight represents a relative importance of the function.

13. The at least one non-transitory machine accessible storage medium of claim 1, wherein the function is one of one or more relevant functions called by the compiled script, wherein each relevant function is associated with respective code that causes control of the particular relevant function to be passed from the execution engine to a function evaluation module.

14. The at least one non-transitory machine accessible storage medium of claim 1, wherein the correlation signature indicates both the compilation event and the execution event are malicious.

15. The at least one non-transitory machine accessible storage medium of claim 1, wherein the compilation event indicates the script includes an evasion technique.

16. The at least one non-transitory machine accessible storage medium of claim 1, wherein the execution event is detected based on at least the parameter in the script meeting or exceeding the predetermined threshold or size.

17. An apparatus for detecting malicious code in a script, the apparatus comprising:
one or more processors; and
one or more memory elements including instructions stored therein, wherein the instructions are executable by at least one of the one or more processors to
evaluate a left side variable name of an assignment statement in the script or a right side value of the assignment statement to produce a result indicating a compilation event;
initiate an execution of a compiled script resulting from a compilation of the script;
detect a function called by the compiled script;
execute the function and perform an evaluation of the function;
detect an execution event during the evaluation of the function, wherein the execution event is detected based on a parameter passed into the function, a result of the function, data written or replaced by the function, or data calculated by the function at least meeting or exceeding a predetermined threshold length or size; and
verify, against a correlation signature defining a combination of events that indicate the script is malicious, a time or a location in the script of an occurrence of the compilation event relative to the execution event.

18. The apparatus of claim 17, wherein the instructions are further executable by at least one of the processors to:
store first information associated with the compilation event in a compilation event queue; and
store second information associated with the execution event in an execution event queue.

19. The apparatus of claim 17, wherein the instructions are further executable by at least one of the one or more processors to:
pass the parameter to the function, wherein the execution event is based on a predetermined threshold length of the parameter.

20. The apparatus of claim 17, wherein the compilation event indicates the script includes an evasion technique, and the execution event is detected based on at least the parameter in the script meeting or exceeding the predetermined threshold or size.

21. A method of detecting malicious code in a script, the method comprising:
evaluating a left side variable name of an assignment statement in the script or a right side value of the assignment statement to produce a result indicating a compilation event;
initiating, by an execution engine, an execution of a compiled script resulting from a compilation of the script;
detecting a function called by the compiled script;
executing the function and performing an evaluation of the function;
detecting an execution event during the evaluation of the function, wherein the execution event is detected based on a parameter passed into the function, a result of the function, data written or replaced by the function, or data calculated by the function at least meeting or exceeding a predetermined threshold length or size; and
verifying, against a correlation signature defining a combination of events that indicate the script is malicious, a time or a location in the script of an occurrence of the compilation event relative to the execution event.

22. The method of claim 21, further comprising:
storing first information associated with the compilation event in a compilation event queue; and
storing second information associated with the execution event in an execution event queue.

23. The method of claim 21, wherein the compilation event indicates the script includes an evasion technique, and the execution event is detected based on at least the parameter in the script meeting or exceeding the predetermined threshold or size.

* * * * *